United States Patent
Bachmann

(10) Patent No.: US 8,386,461 B2
(45) Date of Patent: Feb. 26, 2013

(54) METHOD AND APPARATUS FOR GENERATING HASH MNEMONICS

(75) Inventor: Todd Adam Bachmann, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 12/139,775

(22) Filed: Jun. 16, 2008

(65) Prior Publication Data

US 2009/0313269 A1 Dec. 17, 2009

(51) Int. Cl.
*G06F 17/30* (2006.01)
(52) U.S. Cl. ........................ 707/711; 707/747
(58) Field of Classification Search .................. 707/711, 707/747
See application file for complete search history.

(56) References Cited

U.S. PATENT DOCUMENTS

| | | | | |
|---|---|---|---|---|
| 5,323,316 | A * | 6/1994 | Kadashevich et al. | 704/9 |
| 5,469,354 | A * | 11/1995 | Hatakeyama et al. | 1/1 |
| 5,708,829 | A * | 1/1998 | Kadashevich et al. | 715/236 |
| 6,360,215 | B1 * | 3/2002 | Judd et al. | 1/1 |
| 7,286,987 | B2 * | 10/2007 | Roy | 704/270 |
| 7,453,492 | B2 * | 11/2008 | Silverbrook | 348/207.2 |
| 7,600,125 | B1 * | 10/2009 | Stringham | 713/176 |
| 7,634,657 | B1 * | 12/2009 | Stringham | 713/168 |
| 7,814,129 | B2 * | 10/2010 | Williams | 707/812 |
| 2006/0130020 | A1 * | 6/2006 | Abdullah | 717/140 |
| 2006/0282457 | A1 * | 12/2006 | Williams | 707/102 |
| 2007/0011734 | A1 * | 1/2007 | Balakrishnan et al. | 726/13 |
| 2007/0216651 | A1 * | 9/2007 | Patel | 345/168 |
| 2008/0010365 | A1 * | 1/2008 | Schneider | 709/223 |
| 2009/0055732 | A1 * | 2/2009 | Motaparti et al. | 715/261 |
| 2009/0144719 | A1 * | 6/2009 | Pazdziora | 717/171 |

FOREIGN PATENT DOCUMENTS

| | | |
|---|---|---|
| WO | WO0233882 | 4/2002 |
| WO | 2006100505 A2 | 9/2006 |

OTHER PUBLICATIONS

Atallah, M. et al., "Natural Language Processing for Information Assurance and Security: An Overview and Implementations," Proceedings of the New Security Paradigms Workshop. (NSPW). Ballycotton, County Cork, Ireland, Sep. 18-22, 2000; pp. 51-65, XP000988602, ISBN: 978-1-58113-260-1 the whole document.
International Search Report and Written Opinion—PCT/US2009/046695, International Search Authority—European Patent Office—Nov. 16, 2009.

(Continued)

*Primary Examiner* — James Trujillo
*Assistant Examiner* — Linh Black
(74) *Attorney, Agent, or Firm* — James T. Hagler

(57) ABSTRACT

Methods and computing devices enable users to identify documents using a hash value mapped to a word mnemonic for easy recall and comparison. A hash algorithm may be applied a document to generate a distinguishing hash value. The hash value is mapped to a plurality of words to form the mnemonic. To obtain the words, the hash value may be mapped to word indices used to identify particular words in word lists. Word lists may include a list of nouns, a list of verbs, and a list of adverbs or adjectives, so that the resulting three word mnemonics are memorable. More word lists may be used to map hash values to four-, five- or more word mnemonics. The number-to-mnemonic mapping methods may be used to map large numbers, such as account numbers, telephone numbers, etc. into mnemonics which are easier for people to remember and compare.

56 Claims, 13 Drawing Sheets

OTHER PUBLICATIONS

Jansen W, "Authenticating Mobile Device Users Through Image Selection" The Internet Society: Advances in Learning, Commerce and Security, [Online] vol. 30, 2004, pp. 1-10, XP002553639 Retrieved from the Internet: URL:http://csrc.ncsl.nist.gov/groups/SNS/mobile_security/documents/mobile_devices/PP-VisualAuthentication-rev-DS04.pdf> [retrieved on Oct. 30, 2009] p. 3-p. 6.

Jeyaraman S., et al., "Have the cake and eat it too—Infusing usability into text-password based authentication systems" Computer Security Applications Conference, 21st Annual Tucson, AZ, USA Dec. 5-9, 2005, Piscataway, NJ, USA, IEEE, Dec. 5, 2005, pp. 473-482, XP010869965 ISBN: 978-0-7695-2461-0 p. 473-p. 474; figure 1 p. 476, left-hand col., paragraph 3.1-p. 477, right-hand col., line 16, paragraph 3.2.4.

Menezes, et al., "Handbook of applied cryptography" CRC Press Series on Discrete Mathematics and Its Applications, 1997, pp. 33, 321-322, XP002553640 ISBN: 0-8493-8523-7 p. 33, paragraph 1.9 p. 321, paragraph 9.1-p. 322.

* cited by examiner

| Index | Noun |
|---|---|
| 0 | ant |
| 1 | bat |
| 2 | cat |
| 3 | dog |
| 4 | elf |
| 5 | fox |

FIG. 4

| Index | Verb |
|---|---|
| 0 | sitting |
| 1 | walking |
| 2 | running |
| 3 | sleeping |
| 4 | eating |

FIG. 5

| Index | Adjective |
|---|---|
| 0 | fast |
| 1 | slow |
| 2 | warm |
| 3 | cold |

FIG. 6

Hash = 18,069,913 ← 70

N*V*A = 250 * 200 * 100 = 5,000,000 ← 71

Mod(18,069,913, 5M) = 3,069,913 → reduced Hash H = 3,069,913 ← 72

H/(V*A)=3,069,913/20,000 = 153 + remainder 9913 → noun index = 153 ← 73

(Remainder H/(V*A))/A = 9913/100 =99 + remainder 13 → verb index = 99 ← 74

Mod (3,069,913/100) = 13 → adjective index = 13 ← 75

Noun 153 = "lighter" ← 76

Verb 99 = "crying" ← 77

Adjective 13 = "terrible" ← 78

Noun-Verb-Adjective mnemonic = "lighter crying terrible" ← 79a

Adjective-Noun-Verb mnemonic = "terrible crying lighter" ← 79b

METHOD AND APPARATUS FOR GENERATING HASH MNEMONICS

FIELD OF THE INVENTION

The present invention relates generally to computer systems, and more particularly to methods and apparatus for representing large numbers such as hash values in a memorable word mnemonic.

BACKGROUND

In the computer arts there are many situations in which users are provided with very large numbers that users must recall. Such numbers include document file names, document version and date stamp values, and hash values. Such large numbers add to the blizzard of other large numbers that people are expected to memorize, including social security numbers, employee numbers, telephone numbers, badge numbers, combinations, zip codes, passwords, personal identifier numbers (PIN), etc. Studies have shown that most people have difficulty remembering numbers longer than four digits, yet the variety and quantities of long numbers and random letter combinations that people are expected to memorize (e.g., PINs) only seem to increase with each new technological innovation.

Another problem in the computer arts concerns tracking and distinguishing various versions of large documents, such as complex computer software programs. Small changes to such documents can be difficult to identify and yet may have significant impact on the usefulness of the document. Typically documents are saved under a single file name, with changes and subsequent versions saved to the same file name. Thus, a document's file name is not a reliable means for distinguishing different versions. Adding version numbers and time-stamps to documents and file names can be helpful, but are not fool proof, especially in cases where multiple people are working on "branches" of the same document. Also, users may forget version numbers and time stamps as, again, the complexity of such numerical data is difficult to remember.

SUMMARY

Various embodiment methods enable users to identify versions of complex documents using a hash algorithm to generate a unique hash value reflecting the entire document and a memorable mnemonic for remembering the resulting hash. To uniquely identify a particular document (i.e., content and version), a hash algorithm, preferably a cryptographic hash algorithm, is employed to generate a unique number based upon the document contents. Examples of hash algorithms include known cryptographic hash algorithms, digital signatures, checksum values and cyclic redundancy check (CRC) algorithms used to confirm proper transmission of documents. Typical hash values generated by known hash algorithms are too large to remember. To enable users to remember the number, the hash value is used to create a unique combination of a plurality of smaller numbers that are used as word indices to identify particular words in a plurality of word lists in order to select a unique combination of words to form the mnemonic. This mnemonic then provides a memorable identifier for the document that can be used to uniquely identify the particular version.

The mnemonic embodiment methods also may be used to assist users in remembering large numbers, such as account numbers, telephone numbers, etc. In such embodiments, the large number is mapped to a plurality of smaller numbers that are used as word indices to identify particular words in a plurality of word lists in order to select a unique combination of words to form the mnemonic. This mnemonic is much easier for people to remember than the long number.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIGS. 4-6 are illustrative data structure word lists suitable for use in an embodiment.

DETAILED DESCRIPTION

Figure 1:
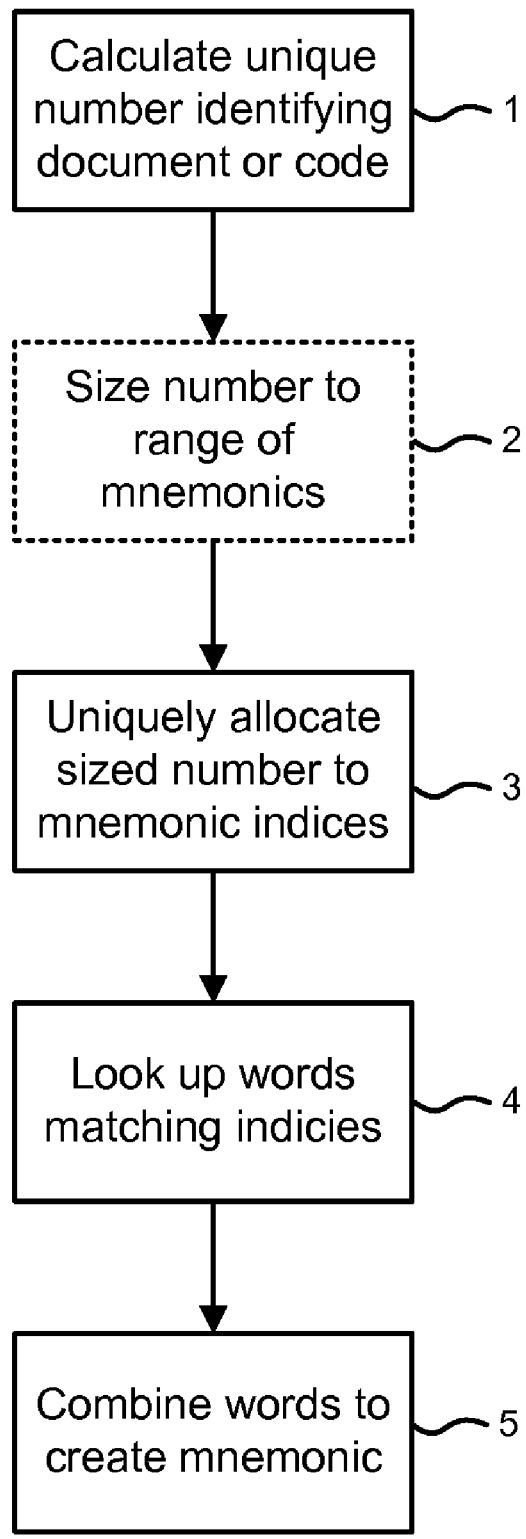
FIG. 1 is a process flow diagram of an overview embodiment method for uniquely identifying a document using a word mnemonic.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used herein to mean "serving as an example, instance, or illustration." Any implementation described herein as "exemplary" is not necessarily to be construed as preferred or advantageous over other implementations.

In this description, the term "mnemonic" is used to refer to a string of words that correlate to another value, such as a large number. Thus a mnemonic is useful as a memorable phrase related to a meaning other than that of the words themselves. In the embodiments, algorithms are used to create mnemonics that correlate to large numbers and to recreate large numbers from the mnemonic. Thus, the term "mnemonic" as used herein may differ from some dictionary meanings, and the following description and the claims are not intended to be limited to a definition of "mnemonic" that is inconsistent with any description of the various embodiments.

As used herein the terms "computer" and "computer system" are intended to encompass any form of programmable computer as may exist or will be developed in the future, including, for example, personal computers, laptop computers, mobile computing devices (e.g., cellular telephones, personal data assistants (PDA), palm top computers, and multi-function mobile devices), main frame computers, servers, and integrated computing systems. A computer typically includes a software programmable processor coupled to a memory circuit, but may further include the components described below with reference to FIG. 16.

As used herein, the terms "hash algorithm" are intended to encompass any form of computational algorithm that given an arbitrary amount of data, computes a fixed size number which can be used (with some probabilistic confidence) to identify an exact version of the input data. The hash algorithm need not be cryptographically secure (i.e. difficult to determine an alternate input that computes to the same reduced number), however the context in which its used may mandate such a requirement. As used herein, the terms "hash" and "hash value" are intended to refer to the output of a hash algorithm.

A frequent problem encountered in developing computer software and other large documents is identifying whether a particular version of the document is the most current or is the same as a particular version stored on a computer system. Such version tracking problems often arise in situations where a document, such as a large computer program or report, is authored by several individuals working collaboratively. In such situations, a document may be revised by two or more individuals simultaneously without their knowledge. As a result, confusion may arise as to whether a particular version reviewed by one individual is the same as the current versions stored on a computer system. This can be particularly troublesome when the large document is a computer program that is being validated for functionality and freedom from errors.

One solution frequently implemented is to require authors to include a date stamp as part of the document, such as in a header or footer line in a word document, or in a comment line in a computer program. Another method is to store versions using a new version number or date stamp in the file name used to store the document on a computer system. However, such methods often fail when authors fail to rigorously implement the version number or date stamp method.

Some computer systems attempt to solve the problem by automatically including a date stamp in the file name every time a file is saved, such as in a filename extension. While more reliable than author-implemented methods, there still may be confusion as to whether a particular version reviewed or tested by one individual is the same as that saved on the system. One reason for such confusion is that the large numbers required to uniquely identify documents on a system computer are difficult for individuals to remember.

One method used to confirm whether a particular version of a document is the same as another is to apply a hash algorithm, such as the MD5 cryptographic hash algorithm, to the document to generate a number (i.e., hash value) based upon the document's contents. Such methods can be used to authenticate a software application by an authenticating agency. When the authenticating agency tests and confirms that a particular version of the software is free of errors or malware, the agency generates a cryptographic hash of the software using a private encryption key. The authenticating agency may use a private encryption key that allows recipients to decode the digital signature to also confirm that the authenticating agency generated the cryptographic hash. The hash value, is then included with the software so that computers can confirm the software version by performing a similar cryptographic hash algorithm on the software code and comparing the result to the hash value associated with the software. Such methods are well known in the computer arts. However, the very large hash value generated by typical hashing algorithms is practically impossible for the average person to memorize. Thus, such methods for uniquely identifying particular documents are limited to computer implemented processing.

The various embodiments provide a user-friendly method for uniquely identifying a document using a memorable word mnemonic. The word mnemonic can be used to identify a particular document and to facilitate comparing two documents to determine if they are identical. Users can determine whether two documents are the same by simply comparing the respective word mnemonics, a very simple task for people to do. Alternatively or in addition, users can determine whether the version of a document stored on a computer matches a version for which the user knows the mnemonic. Using the various embodiments, unique document filenames can be generated for use on a computer system with the file name correlated to memorable mnemonics, allowing people to easily remember the name of particular files stored on the system.

In a further embodiment, any large number can be mapped into a word mnemonic using a structured system that allows the number to be regenerated from the mnemonic. In this manner, account numbers, strong passwords and PIN numbers can be generated for individuals with the number provided to users in a mnemonic format that is easy for people to remember. Combination numbers, such as the sequence of numbers used in a combination lock, telephone numbers, serial numbers, and social security numbers similarly may be mapped into memorable mnemonics using the embodiment methods.

In a further embodiment, the process of mapping a large number, such as a hash value, to a set of indices corresponding two lists of items is extended to encompass other information that may be indexed in lists, such as graphics, colors and backgrounds. In this embodiment, rather than generating a word mnemonic, the indexing methods are used to generate a graphic that uniquely maps to the large number. For example, one list may be file names of line art drawings of a variety of things, like a dog, cat, tree, boat, etc. For example, referring FIG. 4, instead of containing the words "ant," "bat," "cat," etc., the list would include file names to an ant image, such as "ant.tif," a bat image, such a "bat.tif," a cat image, such as "cat.tif," etc. Another list may be to a color to be applied to the line art drawing, and a third list may be to a back ground scene. The combination then would be a colored image within a particular background scene (e.g., a blue monkey at the beach). By providing memorable images, such graphic mnemonics could also be easy for users to remember.

By submitting a document to a cryptographic hash function or a cyclic redundancy check (CRC) algorithm, unique hash values characterizing the entire document can be generated. Two large documents which appear to be the same may be compared to confirm that they are identical simply by comparing their respective hash values. Even a small difference buried deep within a document will result in a different generated hash value. Thus, the use of such methods can be helpful in situations where authors need to keep track of various versions of very large documents. By comparing two document hash values, a person can quickly confirm whether two very large documents are indeed identical.

The hash value generated by commonly used hash or CRC algorithms typically are at least eight hexadecimal characters in length. An example hash value is "0x4a597e27." As useful as this number is for tracking the document version, such a value is very difficult to remember. Thus, users of this method for keeping track of document versions must write down the resulting hash values. Further, comparing two hash values requires close attention since each character needs to be carefully compared.

To overcome these deficiencies, the various embodiments provide methods for mapping a large number, such as a hash value, into a plurality of words selected from word lists specially chosen to generate memorable mnemonics. A variety of embodiment algorithms may be used for mapping the large number into the word lists, a few examples of which are described in the embodiments below. The basic objective is to map the large number into a short phrase which people are more likely to remember. For example, people are unlikely to remember the hash value "0x4a597e27." By mapping this number into a word mnemonic, such as "fuzzy dancing umbrella," the hash value is rendered easier to remember.

In a preferred embodiment, a large number is mapped to a number of word lists broken up by parts of speech so that when the selected words are combined a memorable phrase is produced. For example, the word lists may include a list of nouns, a list of adjectives and a list of verbs so that numbers can be mapped to mnemonic phrases including an adjective followed by a verb followed by a noun. Alternatively, the word lists may consist of a list of nouns, a list of verbs and a list of adverbs, so that numbers can be mapped to mnemonic phrases including a noun followed by a verb followed by an adverb. As a third alternative, the word lists may consist of a first list of adjectives, a second list of adjectives (containing different adjectives from the first list) and a third list of nouns, so that numbers can be mapped to mnemonic phrases including an adjective followed by an adjective followed by a noun. For example, an adjective-verb-noun mnemonic might be "coldly running elf," a noun-verb-adverb mnemonic might be "elf running coldly," and an adjective-adjective-noun mnemonic might be "cold flippant day." While such phrases may sound funny, the humor is likely to spur recall better then a sterile string of numbers and letters generated by a conventional hash algorithm.

A large number, such as a hash value, can be mapped into multiple word lists using any number of methods or algorithms. Two basic methods are illustrated in the drawings and the following descriptions. In the first embodiment example, the large number is mapped into word list indices using standard division and modulus operations. In the second embodiment example, the large number is segmented into groups or portions of digits with each portion serving as a separate index to a respective word list. More complex algorithms may be employed provided that the number is uniquely mapped to word list indices so that each mnemonic maps to a single large number.

In order to provide more memorable mnemonics, the respective word lists may be carefully selected to produce mental imagery and to minimize the number of synonyms within each word list. Further, the word lists may include commonly known words commonly, since one is more likely to remember a word whose meaning is understood. Further, nouns may be selected that refer to tangible objects rather than concepts, since objects are more likely to evoke a mental image that can facilitate memory. Similarly, active verbs may be selected for the verb list since active verbs evoke more imagery then passive verbs like "to be." Further, words may be selected for the word list based on their likelihood to evoke humor or other emotions.

While the various embodiments are described with respect to lists of nouns, verbs and adverbs or adjectives, other parts of speech may be used, including proper names, geographic names, and the names of famous people. For example, if a method is implemented for encoding 10 digit telephone numbers in a memorable mnemonic, the three digits of the area code may be mapped to a large city within the area code since people are likely to recognize or remember the city that is near the location being called.

There are several reasons that a word mnemonic hash is easier to remember than its decimal or hexadecimal equivalent. For one, the adjective-verb-noun format lends itself to mental imagery which is more easily remembered then a raw decimal or hexadecimal number. For another, with a sizable word list, a very large number of digits can be mapped into three or four words. Such simple phrases can quickly be communicated, either verbally or by being typed into a keyboard; much easier than having to carefully enter an eight or nine digit number. Finally, by mapping a large number into a mnemonic comprising different parts of speech, there is less likelihood that people will transpose two elements as language has a characteristic pattern. Even if a person transposes two words, the result will still be useful since each part of speech will be separately recognized as pertaining to particular word lists (e.g., noun or verb or adjective), and thus can be properly interpreted. For example, "fat sitting elf" will be interpreted the same if it is remembered as "elf sitting fat" or "sitting fat elf." Obviously, this is very different from decimal and hexadecimal numbers which are easy to transpose and for which a transposition error is typically hard to recognize and correct.

For similar reasons, an graphic mnemonic may be easy for people to remember. People are graphic creatures naturally able to detect subtle differences in images at a glance. By mapping a large number into a particular graphic, such as a blue monkey on a beach, people are likely to remember the scene and will quickly recognize a different scene, such as a red dog on a carpet.

The number of different mnemonics which can be generated by a series of word lists (or image, color and background lists) is the product of the number of words in each of the word lists. For example, if an adjective word list includes 300 adjectives, a verb word list includes 100 verbs, and a noun word list includes 500 nouns, 15 million unique three word mnemonics can be generated. The number of unique mnemonics can be increased by increasing the number of words in each list and/or by adding additional word lists, such as word lists for an additional part of speech. This latter option is described in more detail below with reference to FIG. 12.

An overview of a method for calculating a unique mnemonic characterizing a particular document version is illustrated in FIG. 1. As a first step, the document is characterized in a hash value by performing a hash or CRC algorithm on the entire document, step 1. Methods for generating a cryptographic hash on a document are well-known in the computer arts, and any of a variety of known hash or CRC algorithms may be used for this purpose. The result will be a large number depending upon the particular hash or CRC algorithm used. Typically, a hash value may be a 32-bit or larger number. Depending upon the size of the word lists being used, the hash value may exceed the number of digits that can be encompassed by the word lists. Accordingly, the hash value may be resized to fit the range encompassed by the unique mnemonics, step 2. For the purposes of characterizing documents, an effective hash or CRC algorithm is likely to generate a number which can be reduced without serious risk of collision (i.e., a collision would be a situation where two reduced hash values are equal even though the documents themselves are different). If the range of unique mnemonics equals or exceeds the possible hash value range, there is no need to resize the hash value. Accordingly this step 2 is optional as indicated by the dashed border.

The hash value or the reduced size hash value is then uniquely allocated to word list indices, step 3. Basically, this step involves mapping the number into a unique group of numbers that can be matched to the indices of the various word lists. As described above, a number of different algorithms may be used for this step, some of which are described in more detail below. Using the word list indices, matching words within the various word lists are obtained, step 4. This may be implemented in a computer system using a simple table lookup process where each index is used as the key to find the corresponding word in a simple two-column database. Finally, the selected words are combined to create a word mnemonic which is presented to the user, step 5.

Figure 2:
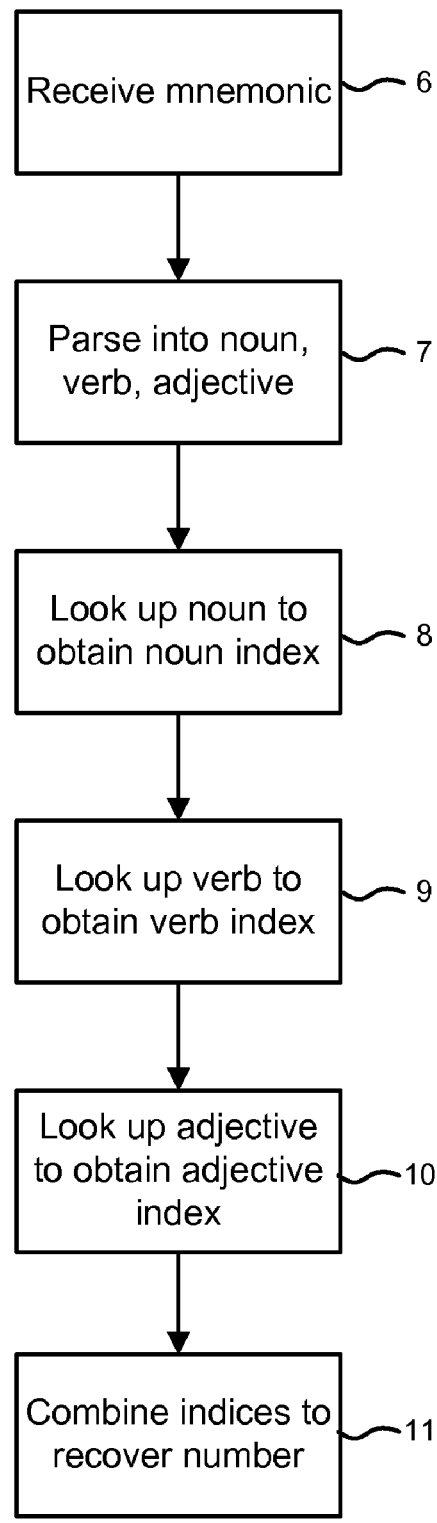
FIG. 2 is a process flow diagram of an overview embodiment method for recovering a large number from a word mnemonic.

The mnemonic can easily be used to recover the corresponding large number using simple methods, an example of which is illustrated in FIG. 2. A user may input the mnemonic, such as by speaking into a voice recognition system or by typing the mnemonic into a keyboard, step 6. A computer then parses the phrase into the parts of speech corresponding to the word lists, such as a noun, a verb and an adjective, step 7. Using the noun, the computer can look up that word in the noun list to obtain the corresponding noun index value, step 8. Similarly, the computer can use the verb to look up that word in the verb list to obtain the corresponding verb index value, step 9, and use the adjective to look up that word in the adjective list to obtain the corresponding adjective index value, step 10. Finally, the noun index, verb index and adjectives index are used to recover the number, step 11. In this method, the noun, verb and adjective lists may be queried in any order. Further, the respective words may be stored in a single database. Also, the various indices may be processed according to algorithms in any predetermined manner in order to recover the original large number in step 11. Thus, a mnemonic may be in spoken or entered the form of an adjective-verb-noun phrase or a adjective-noun-verb phrase, or even in a verb-noun-adjective phrase, and the resulting recovered number will be the same since the respective word lists are used to determine the respective indices, and the recalculation algorithm uses the respective indices in a predetermine order independent of their written or spoke order.

Figure 3:
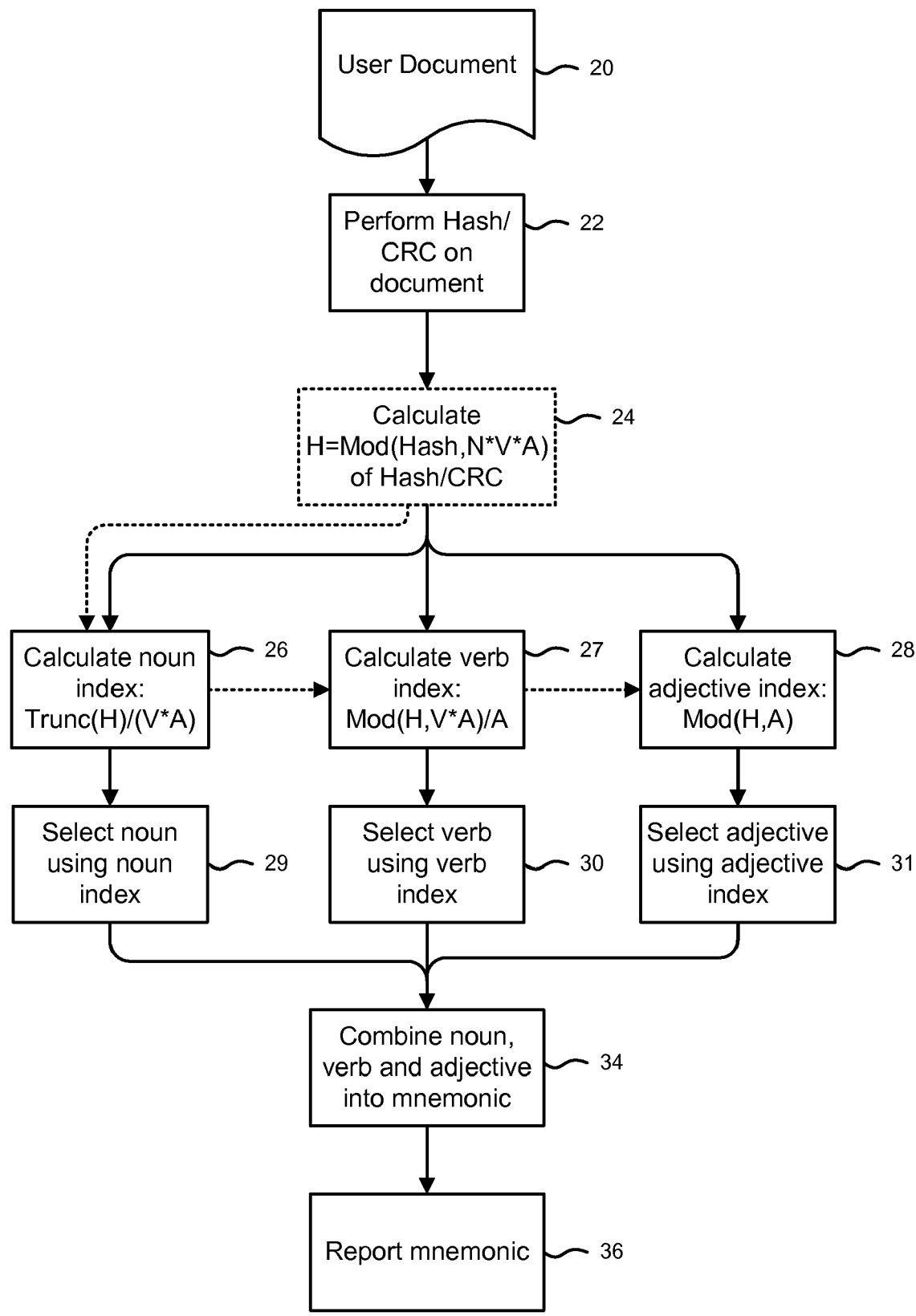
FIG. 3 is a process flow diagram of one embodiment method for uniquely identifying a document using a word mnemonic.

An example of a particular embodiment for generating a mnemonic document identifier is illustrated in FIG. 3. In this embodiment, the hash value is allocated to word indices using standard division and modulus operators. As a first step, a user document to be characterized is entered into a computer system, step 20. For example, the user document may be the source code or the compiled code of a large software application stored in computer memory. As another example, the document may be a very large word and graphic file, such as a proposal or major report that is stored in the computer system memory. Using any of a number of available (or to be developed) hashing or CRC algorithms, the document is processed to generate a characteristic hash value, step 22. As is well known in the computer arts, every character or digit within the document is processed through the hash or CRC algorithm which manipulates the input in a manner that generates a single hash value which is highly likely to indicate even minor modifications by a change in value.

If the size of the hash value exceeds the range of the unique mnemonics (i.e., the largest hash value possible exceeds the product of the number of words in each of the various word lists), then the hash value may be reduced in size by a simple algorithm, optional step 24. For example, a simple way to reduce the size of the hash value is to perform modulus operation on hash value, which takes the remainder of the hash value divided by the product of the number of words in each of the various word lists. For example, with an adjective word list including 300 adjectives, a verb word list including 100 verbs and a noun word list including 500 nouns, (having a product value of 15 million) the modulus operation on a 32-bit hash value divided by 15 million results in a remainder value for which the probability of a collision is only one in 15 million. While that probability is not as good as provided by the 32-bit hash value itself, it is unlikely that a collision will be found for its intended purposes of confirming that two documents are or are not identical. The example embodiment of using modulus arithmetic is easily implemented in a modern computing device, and thus is useful for sizing the hash value to the range covered by the mnemonic word lists.

For simplicity of reference, the reduced size hash value is referred to as "H" in the drawings. To determine the noun index, the hash value or H is divided by the product of the number of verbs times the number of adjectives with the whole number portion of the quotient being used as the noun index, step 26. The remainder quotient is then divided by the number of adjectives with the whole number portion of the quotient being used as the verb index, step 27. The remainder of that division provides the adjective index, step 28. As indicated by the dashed arrows in FIG. 3, each of these mathematical operations provides a result that can be used in the subsequent operation. Thus, an efficient algorithm can be employed to turn a large hash number into three (or more) separate indices using simple division and modulus operations. It should be noted that the process in which the number is allocated into noun, verb and adjective indices can be performed in any order. Calculating the noun index first is only illustrated as one example. Instead, the adjective index could be calculated first, followed by the noun index with the verb index being the remainder. Additionally, as described more fully below with reference to FIG. 12, more than three word lists may be used in forming the mnemonic, so more than three division and modulus operations may be performed in order to break the hash value into separate word indices.

A noun corresponding to the noun index can be identified in the noun word list database by using the noun index as a table lookup key, step 29. Similarly, the corresponding verb can be identified in the verb word list database using the verb index as the table lookup key, step 30, and the corresponding adjective can be identified in the adjective word list database using the adjective index is the table lookup key, step 31.

Using the noun, verb and adjective obtained from the respective word lists databases, the algorithm can combine the words into a mnemonic according to a simple algorithm, step 34. Specifically, this algorithm places the noun, verb and adjective in a preselected order. For example, the order may be adjective-verb-noun or adjective-noun-verb. Instead of an adjective word list, an adverb word list may be used which would allow the mnemonic to be in the form of a noun-verb-adverb, verb-adverb-noun, or adverb-verb-noun mnemonic. Finally, the resulting mnemonic is presented to the user, such in the form of a display or print out, step 36. Additionally, the mnemonic may be added to the document, such as in a header or on a cover page.

A variety of data structures may be employed to store word lists in any usable form within a computer database. Simple examples of three word list database structures are illustrated in FIGS. 4-6. Referring to FIG. 4, a noun word list database 40 may be a simple two column data structure including an index data field 42 and a word data field 44. Each of the respective data records may then include an index value (42-0 through 42-5) and a word stored in the word data field (44-0 through 44-5). The example noun list database 40 illustrated in FIG. 4 shows six example words that may be used in such a database. Similarly, the verb word lists database 50 may include an index data field 52 and a word data field 54, with each respective data record including an index value (52-0 through 52-4) and a word stored in the word data field (54-0 through 54-4). Similarly, the adjective word lists database 60 may include an index data field 62 and a word data field 64, with each respective data record including an index value (62-0 through 62-3) and a word stored in the word data field (64-0 through 64-3). As illustrated in these figures, the various word lists do not need to include the same number of words.

As an example, if a hash or H value is mapped into the noun, verb, adjective indices 4, 3, 3, and the databases illustrated in FIGS. 4-6 are used, the result mnemonic would be "elf sleeping cold" or "cold elf sleeping" or "sleeping cold elf." The particular mnemonic would depend upon the algorithm used to link the various selected words together. Since each of these three mnemonics evokes the same basic imagery, assigning meaning to the order of the words may not be particularly memorable compared to the words themselves.

FIGS. 4-6 can be used to illustrate how a mnemonic can be used to reconstruct the original large word. Using the word "elf," it is easy to find the corresponding index (i.e., 4) in the noun list database 40. Similarly, the verb and adjective indices can be quickly determined. Using the index values, the original number can be reconstructed by concatenating the numbers or multiplying the numbers times values based on the number of words in the respective word lists and adding the products together in an algorithm that is the inverse of the method in which the indices were obtained from the original hash value. A further description of this reconstruction process is provided below with reference to step 84 in FIG. 8.

Figure 7:
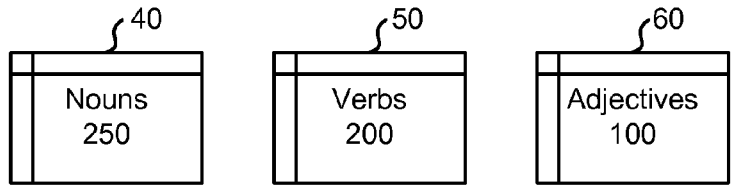
FIG. 7 is an example calculation according to the embodiment illustrated in FIG. 3.

The method illustrated in FIG. 3 is further illuminated by the example illustrated in FIG. 7. In this example, the hash value generated on a particular document is 18,069,913, eq. 70. This value is going to be mapped to a mnemonic generated from a database of nouns 40 comprising 250 words, a database of verbs 50 comprising 200 words, and a database of adjectives 60 comprising 100 words. The product of the number of nouns, verbs and adjectives equals 5 million, eq. 71. To reduce the hash value to within the range of the mnemonics (optional step 24), the hash is divided by 5 million with the resulting remainder H equaling 3,069,913, eq. 72. To determine the noun index, the H value is divided by the number of verbs times the number of adjectives (i.e., 20,000), providing a whole number quotient of 153 as the noun index, eq. 73. The remainder of that calculation, 9913, is divided by the number of adjectives (i.e., 100), providing a verb index of 99, eq. 74. The remainder of that division, 13, provides the adjective index, eq. 75. Using the noun index 153, a corresponding word is identified in the noun word list database 40, in this example the word "lighter," eq. 76. Similarly, using the verb index 99, a corresponding word is identified in the verb word list database 50, in this example the word "crying," eq. 77. Similarly, using the adjective index 13, a corresponding word is identified in the adjective word list database 60, in this example the word "terrible," eq. 78. Finally, these three words are combined into a mnemonic. For example, a noun-verb-adjective mnemonic would be "lighter crying terrible," eq. 79a. Alternatively, an adjective-noun-verb mnemonic would be "terrible crying lighter," eq. 79b.

Having obtained a mnemonic representing a hash value of the document, users can quickly determine whether two documents are the same by comparing the respective three word mnemonics. For example, if a user has reviewed a document with a mnemonic of "terrible crying lighter" the user can determine whether another document is the same simply by reading its three word mnemonic. For example, if the mnemonic were "cold sleeping elf," the user would instantly know that the documents are not identical. Further, a user could request a particular version of the document by asking for the "terrible crying lighter" version.

Figure 8:
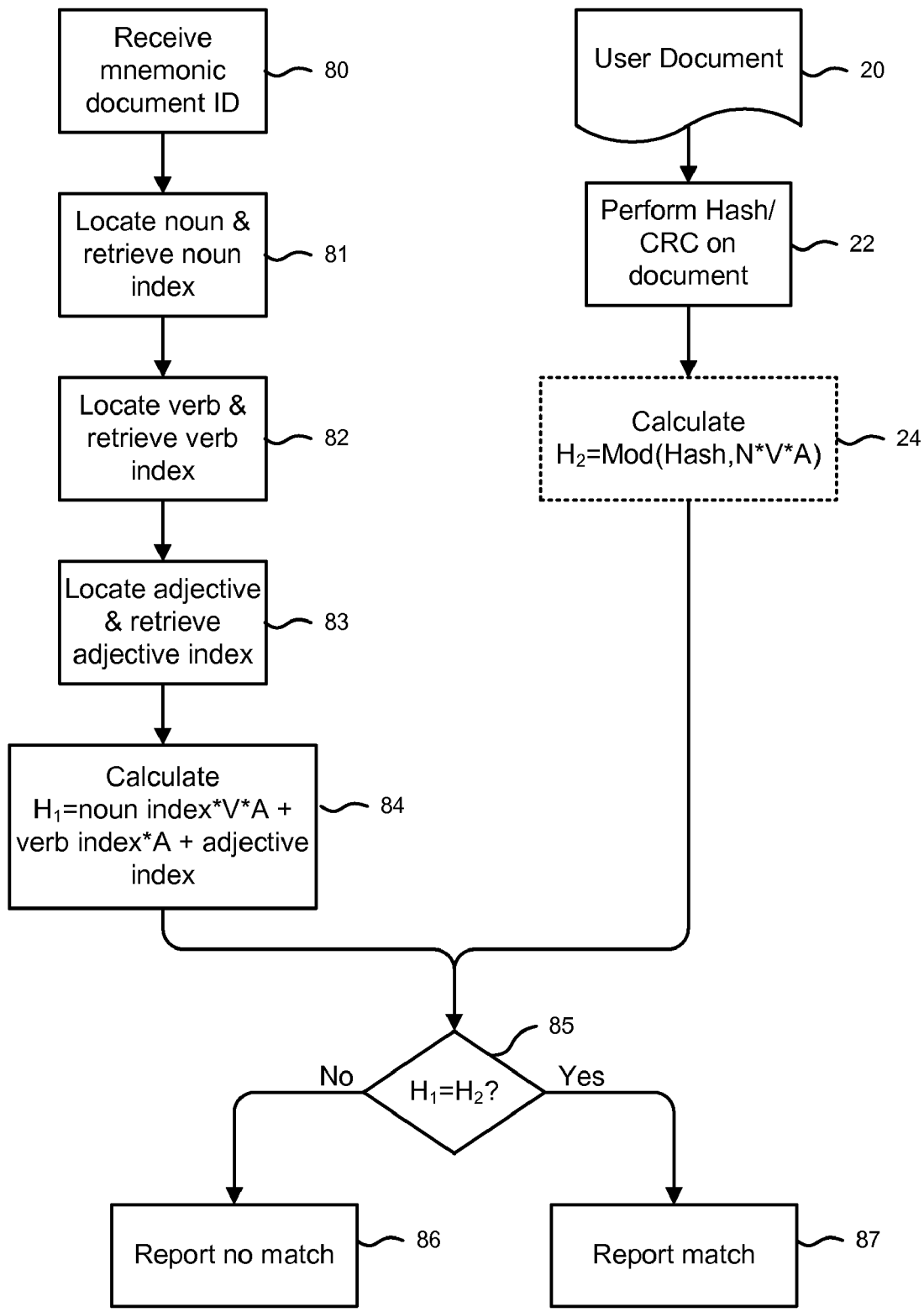
FIG. 8 is process flow diagram of an embodiment method for determining whether a particular document is identical to a document version associated with a word mnemonic.

The mnemonic identifier may also be used by a computer to determine if two documents are the same, such as illustrated in FIG. 8. And this example, a user may enter a mnemonic document identifier into the computer, step 80. The computer can then locate the noun within the mnemonic and use that word to look up the corresponding noun index in the noun word list database, step 81. Similarly, the computer can locate the verb within the mnemonic and use that word to look up the corresponding verb index in the verb word list database, step 82. Similarly, the computer can locate the adjective within the mnemonic and use that word to look up the corresponding adjective index in the adjective word list database, step 83. Then, using the respective indices, the computer can calculate the resulting value of the large number. For example, the H value (in this example referred to as $H_1$) can be obtained by multiplying the noun index times the product of the number of verbs times the number of adjectives, adding that result to the verb index times the number of adjectives and adding to that total the adjective index, step 84. Note that this calculation in step 84 is the inverse of the indices calculations discussed above with reference to FIG. 3.

If the computer has not already determined the hash value of the document being compared, it may access that document, step 20, and perform the same hash or CRC algorithm on it, step 22. The computer may also perform the optional step of reducing the hash value to a smaller number consistent with the range of the unique mnemonics, optional step 24. In FIG. 8, this reduced hash value is referred to as $H_2$.

To determine if the documents are the same, the computer simply compares the two reduced hash numbers, test 85. If $H_1$ equals $H_2$ then the computer may report that the documents indeed match, step 87. However, if the two reduced hash values are not equal, the computer may report that the documents are different, step 86.

Figure 9:
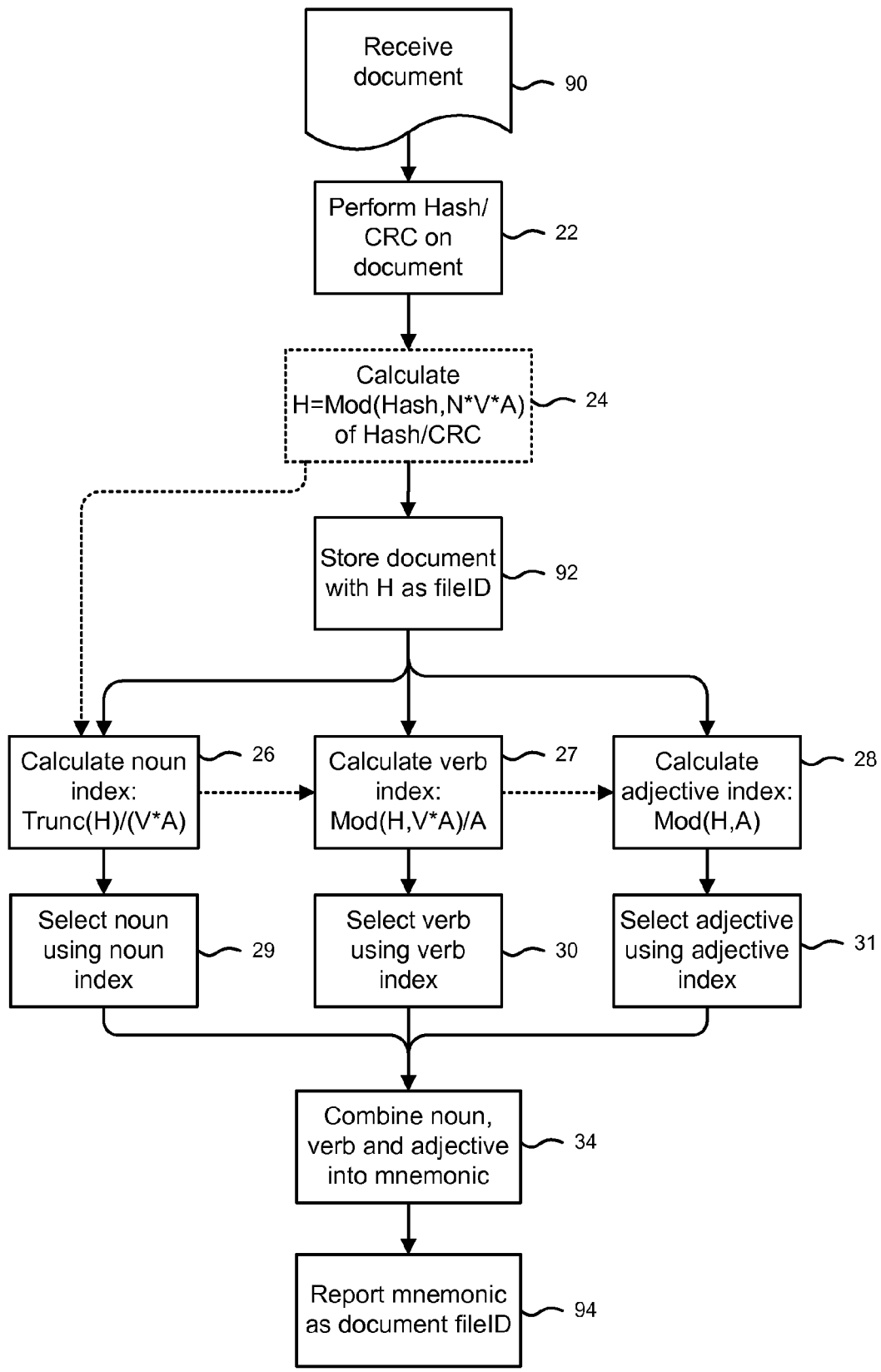
FIG. 9 is a process flow diagram of an embodiment method for generating a unique document file identifier related to a word mnemonic.

The various embodiments have other uses in addition to determining whether two documents are the same. For example, the process may be used to generate unique document names for storing documents in a database or computer system while providing users with document names they are likely to remember. An example of this method is illustrated in FIG. 9. Upon receiving a document to be stored, step 90, the computer can perform a hash or CRC algorithm on the document as described above, step 22. The resulting hash value may be reduced in size as described above, optional step 24. This reduced hash value then becomes the document identifier for storing the document in the database, step 92. While such a number will be unique and therefore useful as a document storage identifier, it may not be very handy for users. Therefore, in order to generate a memorable file name, the document file ID may be mapped into a mnemonic following the steps described above with reference to FIG. 3. Specifically, the file ID may be divided by the number of verbs times the number of adjectives to obtain the noun index, step 26, with the remainder divided by the number of adjectives to yield the verb index, step 27, with the remainder of that calculation providing the adjective index, step 28. Then using the noun, verb, and adjective indices, a corresponding noun, verb and adjective can be identified in the respective word lists, steps 29, 30, 31. The corresponding words can be combined into a mnemonic in an order defined by an algorithm, step 34. Finally, the computer can identify the document's file ID as the resulting mnemonic, step 94.

Figure 10:
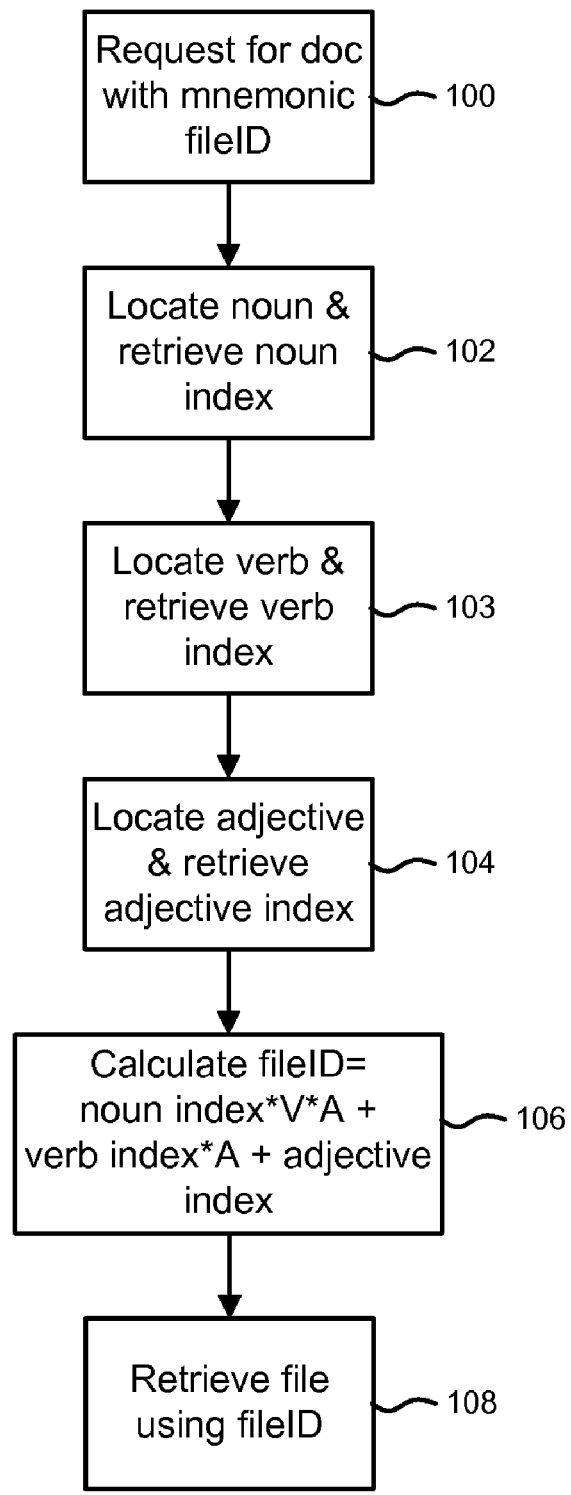
FIG. 10 is a process flow diagram for retrieving a document using a word mnemonic file identifier generated using the method illustrated in FIG. 9.

This mnemonic file ID can be easily used by the computer to locate a file stored in memory as illustrated in FIG. 10. For example, a user trying to access a particular file may enter the mnemonic file ID, step 100. The computer parses the mnemonic to obtain the noun and looks up the corresponding noun index within the noun word list database, step 102. Similarly, the computer obtains the verb from the mnemonic and looks up the corresponding verb index within the verb word list database, step 103. Similarly, the computer obtains the adjective from the mnemonic and looks up the corresponding adjective index within the adjective word list database, step 104. Using these index values, the computer can calculate the file number associated with the corresponding document, step 106. For example, the file number can be obtained by multiplying the noun index times the product of the number of verbs times the number of adjectives, adding that result to the verb index times the number of adjectives and adding to that total the adjective index, step 106. Finally, using the obtained file number, the computer can retrieve the file from memory, step 108.

Figure 11:
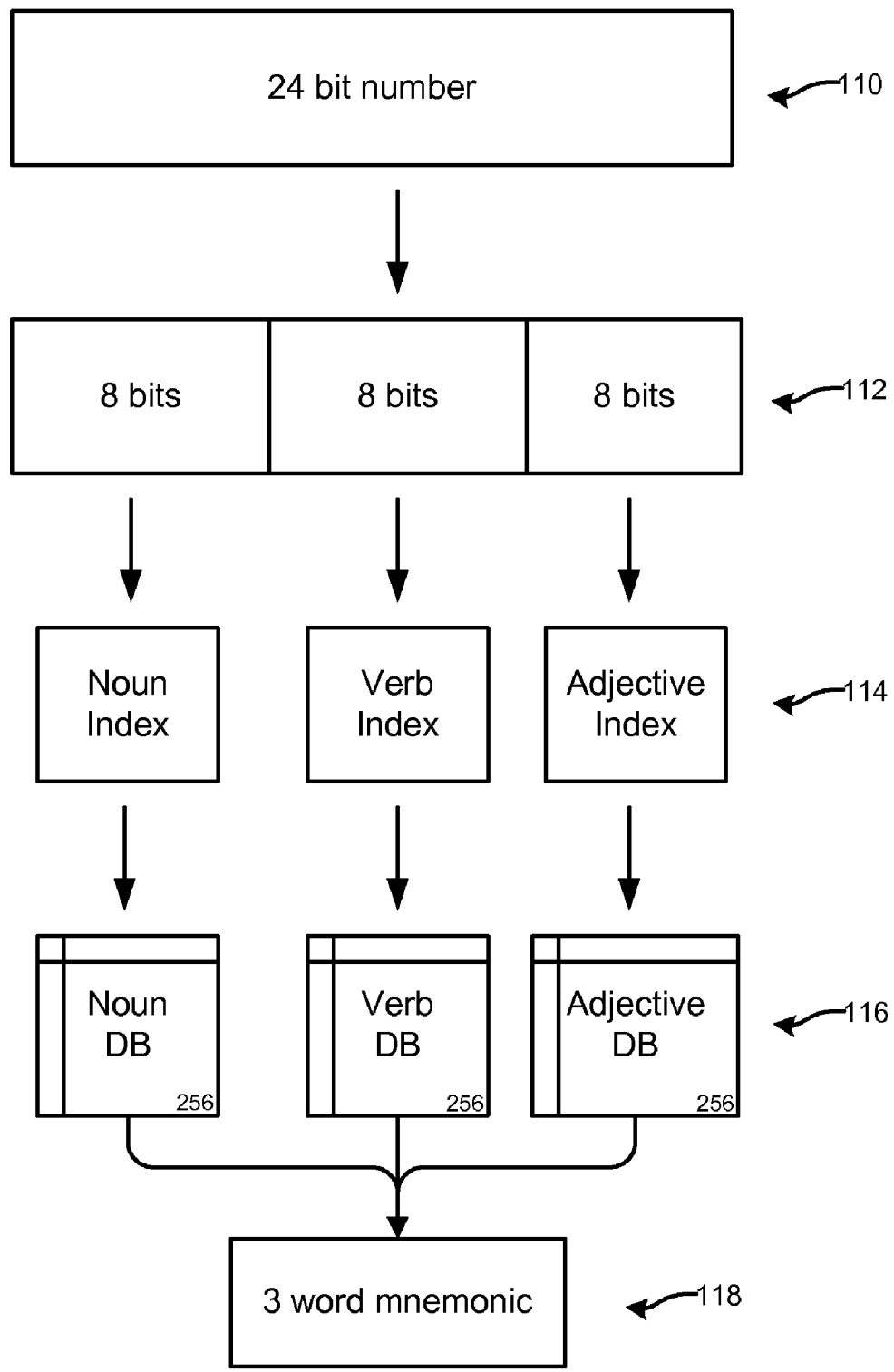
FIG. 11 illustrates an alternative embodiment method for associating a word mnemonic with a large number.

While the foregoing embodiments map large numbers to a set of indices using division and modulus operations, other methods for mapping a number to a set of indices may be employed. For example, FIG. 11 illustrates another method which simply breaks a number up based on its digits. In this example, the starting number is a 24-bit number, step 110. For example, a 32-bit hash value may simply be truncated into the first 24 bits or last 24-bits. Then, this number is broken up into three 8-bit portions, step 112. Each of these eight bit portions is then used as a respective word index, step 114. For example, the first eight bits may be used as the noun index, the second eight bits may be used as the verb index and the last eight bits may be used as the adjective index. Then, as with the methods described above, each of the respective word indices are used to identify a corresponding word within the respective word list databases, step 116. Finally, the three words are combined into a mnemonic, step 118, using some rule for ordering the respective types of words as described more fully above. This method should result in a unique mnemonic for each 24-bit number. Since the method involves less calculation, it may be faster, particularly in computer applications that have limited processing power, such as mobile devices.

Figure 12:
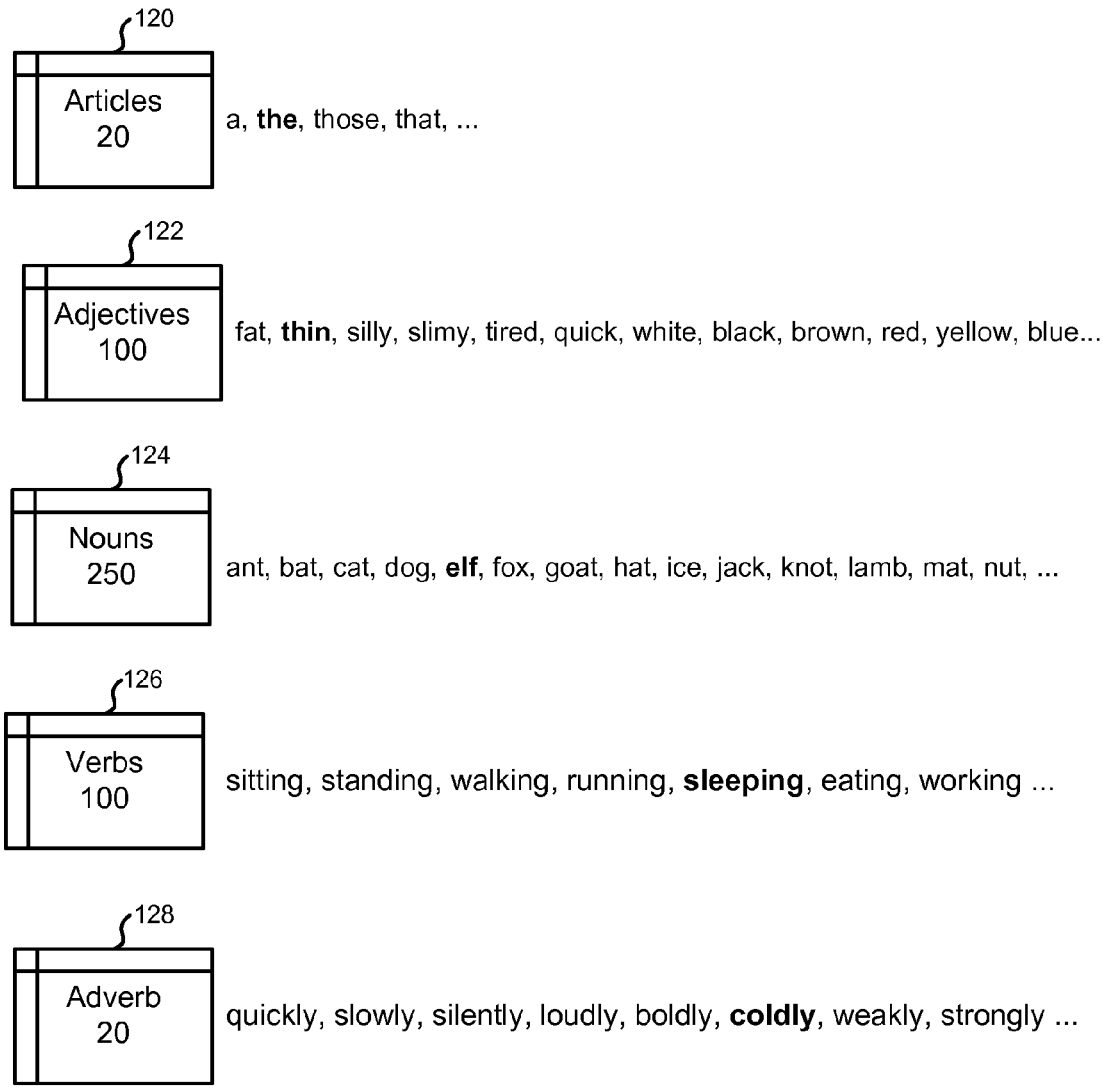
FIG. 12 illustrates another embodiment method for associating a word mnemonic with a large number.

As mentioned above, the embodiments are not limited to noun-verb-adjective or noun-verb-adverb mnemonics. More elements of speech may be employed in order to provide longer mnemonics spanning a greater number of potential combinations. For example, as illustrated in FIG. 12, a sentence mnemonic may be generated using word lists including articles, adjectives, nouns, verbs and adverbs. In the illustrated example, an article word list database 120, containing common articles like "a," "the," etc., may be used in combination with adverb, noun, verb and adverb word lists as described above so that the resulting mnemonic is a short sentence. If the article word list database 120 includes 20 words, the adjective word list database 122 includes 100 words, the noun word list database 124 includes 250 words, the verb word list database 126 includes 100 words, and the adverb word list database 128 includes 20 words, the resulting mnemonic range spans a billion combinations. For example, using the portion of the respective word lists shown in FIG. 12, the mnemonic "The thin elf sleeping coldly" will correspond to the number 50,508,085 using a calculation similar to that described above with reference to step 84 in FIG. 8. Similarly, the mnemonic "A thin elf sleeping coldly" will correspond to the number 508,085. As a third example, the mnemonic "That fat fox eating silently" will correspond to the number 150,010.102. Thus, using five modest word lists, a billion different simple sentence mnemonic combinations can be created. Such a sentence mnemonic may be used in the same manner as three word mnemonics described above for comparing documents and retrieving documents from computer memory.

The method for mapping a large number, such as a reduced hash value, into a word mnemonic can be generalized into a simple algorithm as follows. Mapping the large number (e.g., a reduced hash value) into a plurality of N word indices for N word lists, referred to as $W_1, W_2 \ldots W_N$, can be accomplished by performing the following steps:

a. dividing the number by a product of the number of words in each of the word lists (i.e., the number of words in $W_1$ times the number of words in $W_2$ times the number of words in $W_3$ etc.) and retaining the division remainder $R_0$;

b. dividing the remainder $R_0$ by the number of words in list $W_1$ to obtain a whole number quotient $Q_1$, and a remainder $R_1$;

c. repeating step b for word indices $W_2$ thru $W_{(N-1)}$ dividing the remainder $R_{i-1}$ by the number of words in list $W_i$ to obtain a whole number quotient $Q_i$, and a remainder $R_i$, where the subscript "i" refers the particular word list and may be between 2 and N−1; and d. setting $Q_N$ to be the remainder of the last iteration, $R_{(N-1)}$. Once the indices $Q_1$ through $Q_N$ (referred to generally herein as "$Q_i$") have been computed, each of the indices $Q_i$ is used to index into the corresponding one of the plurality of N word lists to identify a word corresponding to the index $Q_i$. Finally, the identified corresponding words are combined into a word mnemonic.

Figure 13:
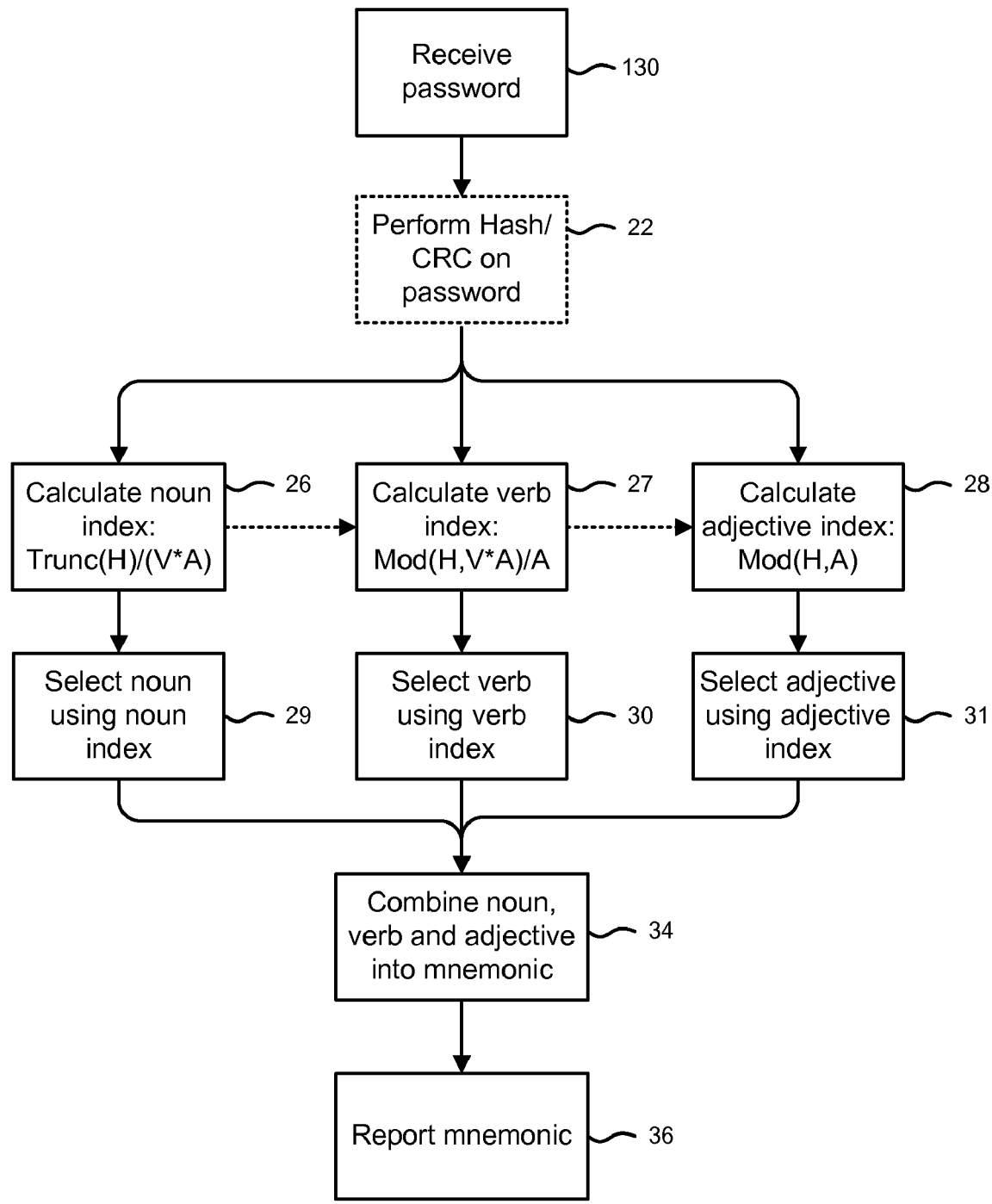
FIG. 13 illustrates an embodiment method for mapping a password into a word mnemonic.

A further use of the various embodiments is to map unique numbers, such as passwords and PIN numbers, into a memorable mnemonic. In order to be a strong password, users are encouraged to avoid the use of names, birth dates, proper nouns and other letter and number combinations which can be easily guessed by a hacker. A strong password then it is a string of numbers and letters that have no obvious logical meaning and include characters and letters of upper and lower case. However, such passwords can be extremely difficult to remember. To address this problem, a strong password can be mapped into a mnemonic using a method similar to that described above and illustrated in FIG. 13. Using this process, a strong password may be generated by an individual or a computer system, step 130. A cryptographic hash or CRC algorithm may then be performed on the strong password, step 22. This step is optional, and thus is shown in FIG. 13 as dashed, because reducing the number of letters and numbers in the password may not yield a sufficiently large number of combinations to provide a strong password. Alternatively, the ASCII bit code associated with each character in the strong password may be used as the basis for a number to be mapped into a mnemonic. The resulting hash or concatenated ASCII code is then mapped into a series of word indices as described above with reference to FIG. 3 or FIG. 11. For example, the number may be divided by the product of the number of verbs and adjectives in order to obtain a noun index, step 26, with the remainder divided by the number of adjectives to determine the verb index, step 27, with the remainder used as the adjective index, step 28. These respective indices are then used to identify a noun, verb and adjective combination from the respective word lists, steps 29, 30, 31. Finally, the noun, verb and adjective are combined into a mnemonic according to a rule of construction, step 34. This mnemonic then is provided to the user as the strong password, step 36. To use this password, a user merely needs to enter the mnemonic into the computer which can then parse the mnemonic to obtain the respective parts of speech and from those words obtain the word indices to reconstruct the strong password in a reverse manner, such as using a method similar to that described above with reference to FIG. 10.

Figure 14:
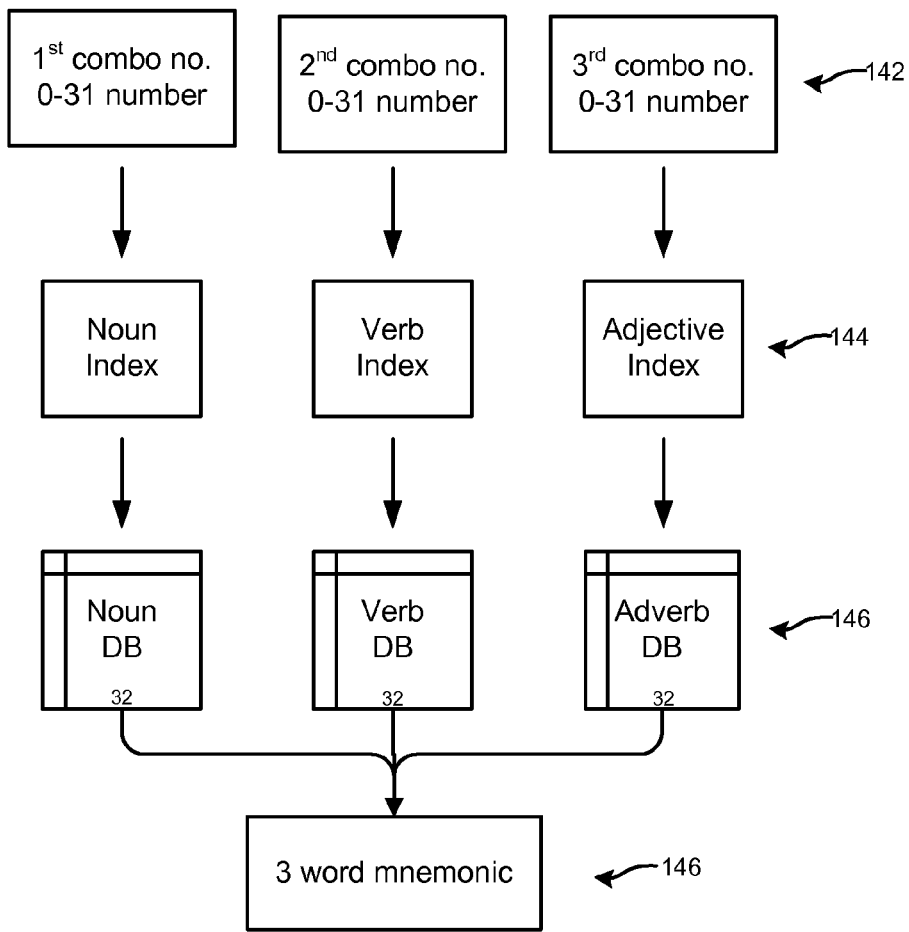
FIG. 14 illustrates an embodiment method for mapping a three number combination into a three word mnemonic.

An example of a simple application of various embodiments is illustrated in FIG. 14 in which a mnemonic is generated to enable people to remember a three number combination, such as may be used in a combination lock. If the combination lock includes three numbers ranging between zero and 31, step 142, each of these numbers may be used as a separate word index, step 144. Then, using word lists comprising at least 32 words each, each combination number is used to look up a corresponding word in a respective word list, step 146. Finally, the identified noun, verb and adjective are combined to form a three word mnemonic, step 146. This simple to remember three word mnemonic will then be as effective of a combination as the original combination number.

Figure 15:
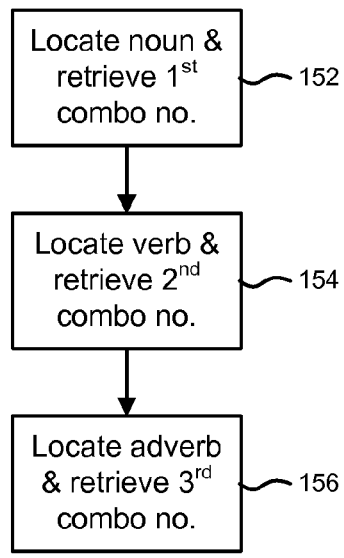
FIG. 15 illustrates an embodiment method for recovering the three number combination from a three word mnemonic.

The resulting mnemonic can be used to reconstruct the original combination number, such as by using the method illustrated in FIG. 15. To determine the combination number using the mnemonic, a user simply uses the noun to look up the first combination number, step 152, the verb to look up the second combination number, step 154, and the adverb to look up the third combination number, step 156. It should be noted that since users and computers can easily differentiate among nouns, verbs and adverbs, there is no problem if a person remembers the words out of order provided that each word list is associated with a particular one of the three combination numbers. The methods illustrated in FIG. 14 and FIG. 15 can be expanded to encompass four and five number combinations simply by adding additional word lists.

The foregoing embodiments can be further enhanced to provide mnemonics for larger numbers, as may be needed to protect against attack. For example, if a large cryptographic hash value is being used to certify documents by a certification authority, it may not be possible to reduce the hash value to fit within the mnemonic range provided by reasonable word lists. While the mnemonic range may be enhanced by adding additional word lists, as described above with reference to FIG. 12, or increasing the number of words within some or all of the word lists, other methods may be used as well. For example, the large hash value may be split into two pieces with each of the two pieces separately mapped into a mnemonic. For example, a 32-bit hash value may be split into two pieces, with the first 16 bits mapped into a first three word mnemonic and the second 16 bits mapped into a second three word mnemonic, with the two mnemonics joined together with the conjunctive "and." Similarly, this method may be extended to encompass larger hash values by breaking the value up into three or more segments each of which is mapped into a memorable mnemonic.

The embodiment employing shapes, colors and backgrounds (and other graphic features) may be implemented in a similar manner as described in the foregoing embodiments except that the list indices are used by a graphics application to look up and apply corresponding graphic elements to create the graphic mnemonic. Thus, the first index may be used by a graphics application to look up a line drawing of a particular thing, the second index may be used to look up a particular color and/or pattern to apply to the line drawing, and the third index may be used to look up a particular background pattern or scene to be applied. Then using these graphic elements, the graphics application may apply the identified color to the identified line drawing and place the result in front of the identified scene. Descriptions of such graphic mnemonics may also be used like word mnemonics, such as to enter the mnemonic into a computer. Using the example of a blue monkey on a beach graphic mnemonic, a user may type "blue monkey beach" or "blue monkey at the beach" into a computer. The computer then may recognize the words which may be linked to the graphics (e.g., in a list containing both a word description and a graphics image or file link) to recover the indices and thus determine the corresponding large number.

The various embodiments may be applied to a variety of applications involving large random numbers, such as serial numbers and account registration numbers. For example, software applications sold commercially often require entry of a large number of numbers and letters in order to register a user's software license. Such random numbers may be easier for consumers to implement if the numbers are mapped into phrases and sentences using the embodiments described herein.

Figure 16:
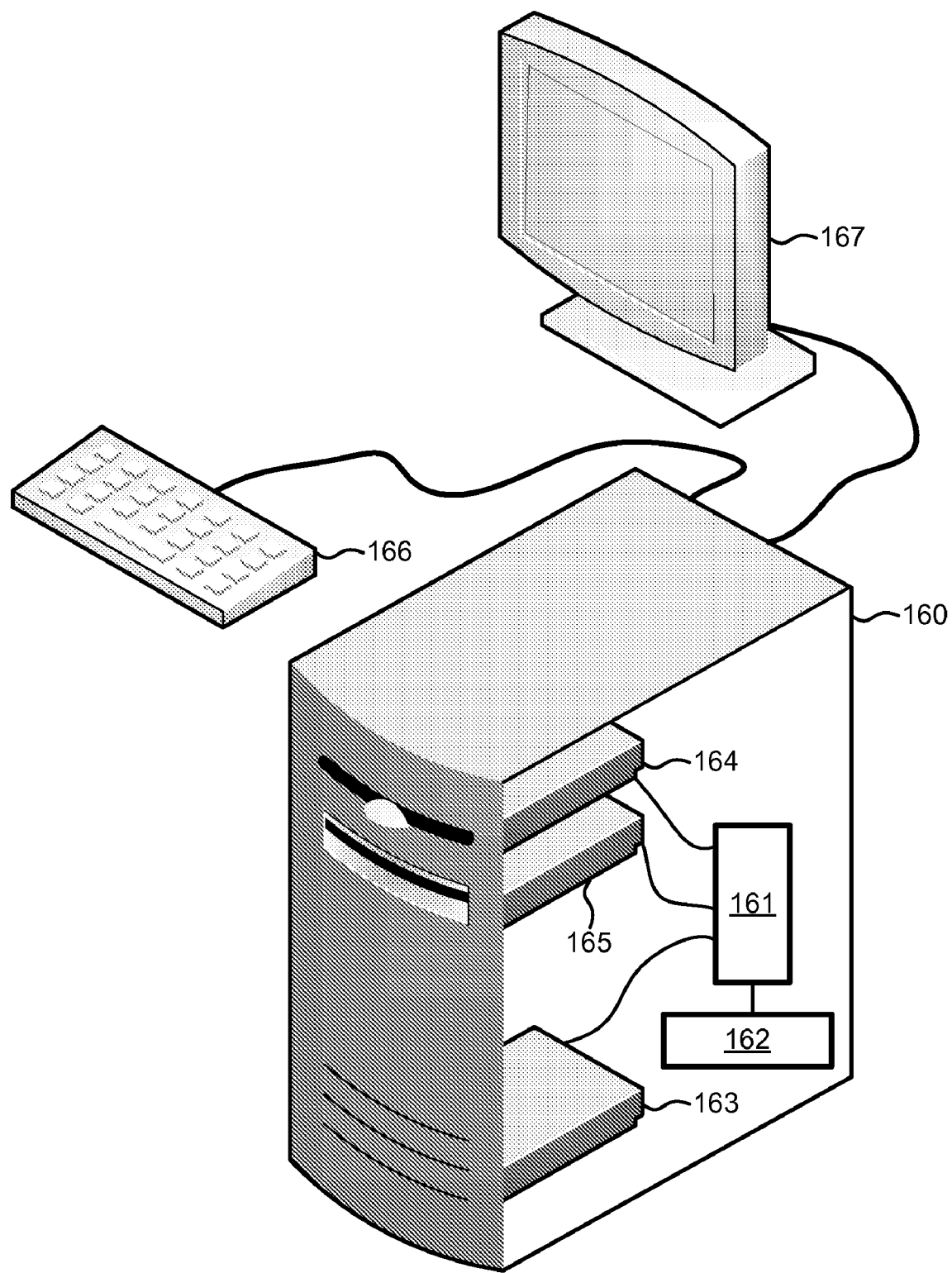
FIG. 16 is a component diagram of a computer system suitable for use with the various embodiments.

The embodiments described above may also be implemented on any of a variety of computing devices, such as, for example a personal computer 160 illustrated in FIG. 16. Such a personal computer 160 typically includes a processor 161 coupled to volatile memory 162 and a large capacity nonvolatile memory, such as a disk drive 163. The computer 180 may also include a floppy disc drive 164 and a compact disc (CD) drive 165 coupled to the processor 161. Typically the computer 160 will also include a user input device like a keyboard 166 and a display 137. The computer 160 may also include a number of connector ports for receiving external memory devices coupled to the processor 161, such as a universal serial bus (USB) port (not shown), as well as network connection circuits (not shown) for coupling the processor 161 to a network.

The various embodiments may be implemented by a computer processor 161 executing software instructions configured to implement one or more of the described methods. Such software instructions may be stored in memory 162, 163 as separate applications, as part of the computer's operating system software, as a series of APIs implemented by the operating system, or as compiled software implementing an embodiment method. Further, the software instructions may be stored on any form of tangible processor-readable memory, including: a random access memory 162, hard disc memory 163, a floppy disc (readable in a floppy disc drive 164), a compact disc (readable in a CD drive 165), read only memory (such as an EEPROM), and/or a memory module (not shown) plugged into the computer 160, such as an external memory chip or a USB-connectable external memory (e.g., a "flash drive").

The various embodiments offer a number of computer processing advantages beyond providing individuals with easily remembered mnemonics. For example, many documents, files, phone numbers, and other types of file objects are normally indexed and stored within computer systems using large numbers as identifiers. When users must enter such large numbers, such as by typing them into a keyboard or speaking them into a voice recognition system, the time required to enter all of the digits can be significant. Also, as mentioned above, the probability of transposition can be high, particularly for very long numbers. By reducing a complex number into a short word mnemonic, users can enter the mnemonic into the computer system much faster. Also, any transposition errors are of no consequence. Speech recognition systems may further benefit from the various embodiments by providing a finite database of words that can be recognized in order to obtain verbal input of a very large number. Since the word lists are finite and the words entered in a particular order, computer systems may be configured to more easily recognize the mnemonic phrases than would be possible for receiving the letters and numbers of the corresponding file directly. Additionally, since fewer words need to be recognized to receive a large number, the amount of processing required to properly understand a mnemonic may be less than that required for understanding the entire filename directly.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for mapping a large number into a word mnemonic, comprising:
   mapping the large number to a plurality of word indices;
   using each one of the plurality of word indices to identify a corresponding word within a respective one of a plurality of word lists, wherein the plurality of word lists comprises first, second and third word lists each containing a number of words;
   combining each of the plurality of identified corresponding words to form the word mnemonic, wherein the word mnemonic comprises first, second and third words;
   dividing the hash value by a product of the number of words in the first word list times the number of words in the second word list times the number of words in the third word list to obtain a reduced hash value;
   dividing the reduced hash value by a product of the number of words in the second word list times the number of words in the third word list to obtain a first whole number quotient and a first remainder;
   using the first whole number quotient as a first word index to identify the first word in the first word list;
   dividing the first remainder by the number of words in the third word list to obtain a second whole number quotient and a second remainder;
   using the second whole number quotient as a second word index to identify the second word in the second word list;
   using the second remainder as a third word index to identify the third word in the third word list; and
   combining the first, second and third words to form the word mnemonic.

2. The method of claim 1, further comprising reducing a size of the hash value prior to mapping the hash value to the plurality of word indices.

3. The method of claim 2, wherein the large number is a hash value obtained by applying a hash algorithm to a document to generate the hash value.

4. The method of claim 3, wherein the hash algorithm is a cryptographic hash algorithm.

5. The method of claim 3, wherein the hash algorithm is a cyclic redundancy check algorithm.

6. The method of claim 3, wherein the hash algorithm is a checksum algorithm.

7. The method of claim 1, wherein:
   a first word list within the plurality of word lists is a list of nouns; and
   a second word list within the plurality of word lists is a list of verbs.

8. The method of claim 7, wherein a third word list within the plurality of word lists is a list of adjectives.

9. The method of claim 7, wherein a third word list within the plurality of word lists is a list of adverbs.

10. The method of claim 1, wherein:
    a first word list within the plurality of word lists is a first list of adjectives;
    a second word list within the plurality of word lists is a second list of adjectives; and
    a third word list within the plurality of word lists is a list of nouns.

11. A method for mapping a large number into a word mnemonic, comprising:
    mapping the large number to a plurality of word indices, wherein the large number is a hash value obtained by applying a hash algorithm to a document to generate the hash value;

using each one of the plurality of word indices to identify a corresponding word within a respective one of a plurality of word lists;

combining each of the plurality of identified corresponding words to form a word mnemonic; and reducing a size of the hash value prior to mapping the hash value to the plurality of word indices, wherein mapping the hash value into a mnemonic comprises:

dividing the hash value by a product of the number of words in the first word list times the number of words in the second word list times the number of words in the third word list to obtain a reduced hash value;

segmenting the reduced hash value into a plurality of digit portions;

using each of the plurality of digit portions as an index to identify a corresponding word within one of a plurality of word lists; and combining the identified words to form the word mnemonic.

12. The method of claim 1, wherein mapping the large number into a plurality of word indices comprises:

segmenting the large number into a plurality of digit portions; and using the plurality of digit portions as the plurality of word indices.

13. A method for mapping a large number into a word mnemonic, comprising:

mapping the large number to a plurality of word indices, wherein mapping the large number into a plurality of word indices comprises:

dividing the large number by a product of a number of words in a second word list times a number of words in a third word list to obtain a first whole number quotient and a first remainder, wherein the first whole number quotient is a first word index; and dividing the first remainder by the number of words in the third word list to obtain a second whole number quotient and a second remainder, wherein the second whole number quotient is a second word index and the second remainder is a third word index;

using each one of the plurality of word indices to identify a corresponding word within a respective one of a plurality of word lists, wherein using each one of the plurality of word indices to identify a corresponding word within a respective one of a plurality of word lists comprises:

using the first word index to identify a first word in a first word list;

using the second word index to identify a second word in the second word list; and using the third word index to identify a third word in a third word list; and combining each of the plurality of identified corresponding words to form the word mnemonic, wherein combining the plurality of identified corresponding words to form the word mnemonic comprises combining the first, second and third identified words to form the word mnemonic.

14. A method for mapping a large number into a word mnemonic, comprising:

mapping the large number into a plurality of N word indices, referred to as $W_1, W_2 \ldots W_N$, by perform the steps of a. dividing the large number by a product of the number of words in each of the word lists and retaining a division remainder $R_0$, b. dividing the remainder $R_0$ by the number of words in list $W_1$ to obtain a whole number quotient $Q_1$, and a remainder $R_1$, c. repeating step b for word indices $W_2$ thru $W_{(N-1)}$ dividing a remainder $R_{i+1}$ by the number of words in list $W_i$ to obtain a whole number quotient $Q_i$, and a remainder $R_i$ and d. setting $Q_N$ to be a remainder of the last iteration, $R_{(N-1)}$;

using the indices $Q_i$ to index into the plurality of word lists to identify corresponding words; and combining the identified corresponding words into a word mnemonic.

15. A computer, comprising:

a processor; and a memory coupled to the processor, wherein the processor is configured with software instructions to perform steps comprising:

mapping a large number to a plurality of word indices;

using each one of the plurality of word indices to identify a corresponding word within a respective one of the plurality of word lists; wherein the plurality of word lists comprises first, second and third word lists each containing a number of words;

combining the plurality of identified corresponding words to form a word mnemonic, wherein the word mnemonic comprises first, second and third words;

dividing the hash value by a product of the number of words in the first word list times the number of words in the second word list times the number of words in the third word list to obtain a reduced hash value;

dividing the reduced hash value by a product of the number of words in the second word list times the number of words in the third word list to obtain a first whole number quotient and a first remainder;

using the first whole number quotient as a first word index to identify the first word in the first word list;

dividing the first remainder by the number of words in the third word list to obtain a second whole number quotient and a second remainder;

using the second whole number quotient as a second word index to identify the second word in the second word list;

using the second remainder as a third word index to identify the third word in the third word list; and combining the first, second and third words to form a word mnemonic.

16. The computer of claim 15, wherein the processor is configured with software instructions to perform steps further comprising reducing the size of the hash value prior to mapping the hash value to the plurality of word indices.

17. The computer of claim 16, wherein the processor is configured with software instructions to perform steps further comprising applying a hash algorithm to a document to generate a hash value, wherein the large number is the hash value.

18. The computer of claim 17, wherein the hash algorithm is a cryptographic hash algorithm.

19. The computer of claim 17, wherein the hash algorithm is a cyclic redundancy check algorithm.

20. The computer of claim 17, wherein the hash algorithm is a checksum algorithm.

21. The computer of claim 15, wherein:

a first word list within the plurality of word lists is a list of nouns; and a second word list within the plurality of word lists is a list of verbs.

22. The computer of claim 21, wherein a third word list within the plurality of word lists is a list of adjectives.

23. The computer of claim 21, wherein a third word list within the plurality of word lists is a list of adverbs.

24. The computer of claim 15, wherein:
a first word list within the plurality of word lists is a first list of adjectives;
a second word list within the plurality of word lists is a second list of adjectives; and
a third word list within the plurality of word lists is a list of nouns.

25. The computer of claim 15, wherein the processor is configured with software instructions to perform steps mapping the large number to the plurality of word indices comprising:
segmenting the large number into a plurality of digit portions;
using the plurality of digit portions as the plurality of word indices.

26. A computer, comprising:
a processor; and
a memory coupled to the processor,
wherein the processor is configured with software instructions to perform steps comprising:
mapping a large number to a plurality of word indices, wherein mapping the large number to a plurality of word indices comprises:
dividing the large number by a product of a number of words in a second word list times a number of words in a third word list to obtain a first whole number quotient and a first remainder, wherein the first whole number quotient is a first word index; and
dividing the first remainder by the number of words in the third word list to obtain a second whole number quotient and a second remainder, wherein the second whole number quotient is a second word index and the second remainder is a third word index;
using each one of the plurality of word indices to identify a corresponding word within a respective one of a plurality of word lists, wherein using each one of the plurality of word indices to identify a corresponding word within a respective one of a plurality of word lists comprises:
using the first word index to identify a first word in the first word list;
using the second word index to identify a second word in the second word list; and
using the third word index to identify a third word in the third word list; and
combining each of the plurality of identified corresponding words to form a word mnemonic, wherein combining the plurality of identified words to form the word mnemonic comprising comprises:
combining the first, second and third identified words to form the word mnemonic.

27. A computer, comprising:
means for mapping a large number to a plurality of word indices;
means for using each one of the plurality of word indices to identify a corresponding word within a respective one of a plurality of word lists, wherein the plurality of word lists comprises first, second and third word lists each containing a number of words;
means for combining the plurality of corresponding identified words to form a word mnemonic, wherein the word mnemonic comprises first, second and third words;
means for dividing the hash value by a product of the number of words in the first word list times the number of words in the second word list times the number of words in the third word list to obtain a reduced hash value;
means for dividing the reduced hash value by a product of the number of words in the second word list times the number of words in the third word list to obtain a first whole number quotient and a first remainder;
means for using the first whole number quotient as a first word index to identify the first word in the first word list;
means for dividing the first remainder by the number of words in the third word list to obtain a second whole number quotient and a second remainder;
means for using the second whole number quotient as a second word index to identify the second word in the second word list;
means for using the second remainder as a third word index to identify the third word in the third word list; and
means for combining the first, second and third words to form a word mnemonic.

28. The computer of claim 27, further comprising means for reducing the size of the hash value prior to mapping the hash value to the plurality of word indices.

29. The computer of claim 28, further comprising:
means for applying a hash algorithm to the document to generate a hash value, wherein the hash value is the large number.

30. The computer of claim 29, wherein the hash algorithm is a cryptographic hash algorithm.

31. The computer of claim 29, wherein the hash algorithm is a cyclic redundancy check algorithm.

32. The computer of claim 29, wherein the hash algorithm is a checksum algorithm.

33. The computer of claim 27, wherein:
a first word list within the plurality of word lists is a list of nouns; and
a second word list within the plurality of word lists is a list of verbs.

34. The computer of claim 33, wherein a third word list within the plurality of word lists is a list of adjectives.

35. The computer of claim 33, wherein a third word list within the plurality of word lists is a list of adverbs.

36. The computer of claim 27, wherein:
a first word list within the plurality of word lists is a first list of adjectives;
a second word list within the plurality of word lists is a second list of adjectives; and
a third word list within the plurality of word lists is a list of nouns.

37. The computer of claim 27, further comprising:
means for segmenting the large number into a plurality of digit portions;
means for using the plurality of digit portions as the plurality of word indices.

38. A computer, comprising:
means for mapping a large number to a plurality of word indices, wherein means for mapping the large number to a plurality of word indices comprises:
means for dividing the large number by a product of a number of words in a second word list times a number of words in a third word list to obtain a first whole number quotient and a first remainder, wherein the first whole number quotient is a first word index; and
means for dividing the first remainder by the number of words in the third word list to obtain a second whole number quotient and a second remainder, wherein the second whole number quotient is a second word index and the second remainder is a third word index;

means for using each one of the plurality of word indices to identify a corresponding word within a respective one of a plurality of word lists, wherein means for using each one of the plurality of word indices to identify a corresponding word within a respective one of a plurality of word lists comprises:

means for using the first word index to identify a first word in the first word list;

means for using the second word index to identify a second word in the second word list; and means for using the third word index to identify a third word in the third word list; and means for combining each of the plurality of identified corresponding words to form a word mnemonic, wherein means for combining the plurality of identified correspond words to form the word mnemonic comprises means for combining the first, second and third identified words to form the word mnemonic.

39. A non-transitory processor-readable storage medium having stored thereon processor-executable software instructions configured to cause a processor of a computer to perform steps comprising:

mapping a large number to a plurality of word indices;

using each one of the plurality of word indices to identify a corresponding word within a respective one of the plurality of word lists; wherein the plurality of word lists comprises first, second and third word lists each containing a number of words;

combining the plurality of identified corresponding words to form a word mnemonic, wherein the word mnemonic comprises first, second and third words;

dividing the hash value by a product of the number of words in the first word list times the number of words in the second word list times the number of words in the third word list to obtain a reduced hash value;

dividing the reduced hash value by a product of the number of words in the second word list times the number of words in the third word list to obtain a first whole number quotient and a first remainder;

using the first whole number quotient as a first word index to identify the first word in the first word list;

dividing the first remainder by the number of words in the third word list to obtain a second whole number quotient and a second remainder;

using the second whole number quotient as a second word index to identify the second word in the second word list;

using the second remainder as a third word index to identify the third word in the third word list; and combining the first, second and third words to form a word mnemonic.

40. The non-transitory processor-readable storage medium of claim 39, wherein the tangible storage medium has processor-executable software instructions configured to cause a processor of a computer to perform further steps comprising reducing a size of the hash value prior to mapping the hash value to the plurality of word indices.

41. The non-transitory processor-readable storage medium of claim 40, wherein the tangible storage medium has processor-executable software instructions configured to cause a processor of a computer to perform further steps comprising applying a hash algorithm to a document to generate a hash value, wherein the hash value is the large number.

42. The non-transitory processor-readable storage medium of claim 41, wherein the hash algorithm is a cryptographic hash algorithm.

43. The non-transitory processor-readable storage medium of claim 41, wherein the hash algorithm is a cyclic redundancy check algorithm.

44. The non-transitory processor-readable storage medium of claim 41, wherein the hash algorithm is a checksum algorithm.

45. The non-transitory processor-readable storage medium of claim 39, wherein:

a first word list within the plurality of word lists is a list of nouns; and a second word list within the plurality of word lists is a list of verbs.

46. The non-transitory processor-readable storage medium of claim 39, wherein a third word list within the plurality of word lists is a list of adjectives.

47. The non-transitory processor-readable storage medium of claim 39, wherein a third word list within the plurality of word lists is a list of adverbs.

48. The non-transitory processor-readable storage medium of claim 39, wherein:

a first word list within the plurality of word lists is a first list of adjectives;

a second word list within the plurality of word lists is a second list of adjectives; and a third word list within the plurality of word lists is a list of nouns.

49. The non-transitory processor-readable storage medium of claim 39, wherein the tangible storage medium has processor-executable software instructions configured to cause a processor of a computer to perform steps mapping the large number to the plurality of word indices comprising:

segmenting the hash value into a plurality of digit portions;

using the plurality of digit portions as the plurality of word indices.

50. A non-transitory processor-readable storage medium having stored thereon processor-executable software instructions configured to cause a processor of a computer to perform steps comprising:

mapping a larger number to a plurality of word indices, wherein mapping the large number to the plurality of word indices comprises:

dividing the large number by a product of a number of words in a second word list times a number of words in a third word list to obtain a first whole number quotient and a first remainder, wherein the first whole number quotient is a first word index; and dividing the first remainder by the number of words in the third word list to obtain a second whole number quotient and a second remainder, wherein the second whole number quotient is a second word index and the second remainder is a third word index;

using each one of the plurality of word indices to identify a corresponding word within a respective one of a plurality of word lists, wherein using each one of the plurality of word indices to identify a corresponding word within a respective one of a plurality of word lists comprises:

using the first word index to identify a first word in the first word list;

using the second word index to identify a second word in the second word list; and using the third word index to identify a third word in the third word list; and combining each of the plurality of identified corresponding words to form a word mnemonic, wherein combining the plurality of identified corresponding words to for the word mnemonic comprises combining the first, second and third identified words to form the word mnemonic.

51. A computer, comprising:

a processor; and a memory coupled to the processor, wherein the processor is configured with software instructions to perform steps comprising:

mapping a large number to a plurality of word indices, wherein the large number is a hash value obtained by applying a hash algorithm to a document to generate the hash value;

using each one of the plurality of word indices to identify a corresponding word within a respective one of a plurality of word lists;

combining each of the plurality of identified corresponding words to form a word mnemonic; and reducing a size of the hash value prior to mapping the hash value to the plurality of word indices, wherein mapping the hash value into a mnemonic comprises:

dividing the hash value by a product of the number of words in the first word list times the number of words in the second word list times the number of words in the third word list to obtain a reduced hash value;

segmenting the reduced hash value into a plurality of digit portions;

using each of the plurality of digit portions as an index to identify a corresponding word within one of a plurality of word lists; and combining the identified words to form a word mnemonic.

52. A computer, comprising:

a processor; and a memory coupled to the processor, wherein the processor is configured with software instructions to perform steps comprising:

mapping a large number into a plurality of N word indices, referred to as $W_1, W_2 \ldots W_N$, by perform the steps of a. dividing the large number by a product of the number of words in each of the word lists and retaining a division remainder $R_0$, b. dividing the remainder $R_0$ by the number of words in list $W_1$ to obtain a whole number quotient $Q_1$, and a remainder $R_1$, c. repeating step b for word indices $W_2$ thru $W_{(N-1)}$ dividing a remainder $R_{i+1}$ by the number of words in list $W_i$ to obtain a whole number quotient $Q_i$, and a remainder $R_i$ and d. setting $Q_N$ to be a remainder of the last iteration, $R_{(N-1)}$;

using the indices $Q_i$ to index into the plurality of word lists to identify corresponding words; and combining the identified corresponding words into a word mnemonic.

53. A computer, comprising:

means for mapping a large number to a plurality of word indices, wherein the large number is a hash value obtained by applying a hash algorithm to a document to generate the hash value;

means for using each one of the plurality of word indices to identify a corresponding word within a respective one of a plurality of word lists;

means for combining each of the plurality of identified corresponding words to form a word mnemonic; and means for reducing a size of the hash value prior to mapping the hash value to the plurality of word indices, wherein mapping the hash value into a mnemonic comprises:

means for dividing the hash value by a product of the number of words in the first word list times the number of words in the second word list times the number of words in the third word list to obtain a reduced hash value;

means for segmenting the reduced hash value into a plurality of digit portions;

means for using each of the plurality of digit portions as an index to identify a corresponding word within one of a plurality of word lists; and means for combining the identified words to form a word mnemonic.

54. A computer, comprising:

means for mapping a large number into a plurality of N word indices, referred to as $W_1, W_2 \ldots W_N$, by perform the steps of a. dividing the large number by a product of the number of words in each of the word lists and retaining a division remainder $R_0$, b. dividing the remainder $R_0$ by the number of words in list $W_1$ to obtain a whole number quotient $Q_i$, and a remainder $R_1$, c. repeating step b for word indices $W_2$ thru $W_{(N-1)}$ dividing a remainder $R_{i+1}$ by the number of words in list $W_i$ to obtain a whole number quotient $Q_i$, and a remainder $R_i$ and d. setting $Q_N$ to be a remainder of the last iteration, $R_{(N-1)}$;

means for using the indices $Q_i$ to index into the plurality of word lists to identify corresponding words; and means for combining the identified corresponding words into a word mnemonic.

55. A non-transitory processor-readable storage medium having stored thereon processor-executable software instructions configured to cause a processor of a computer to perform steps comprising:

mapping a large number to a plurality of word indices, wherein the large number is a hash value obtained by applying a hash algorithm to a document to generate the hash value;

using each one of the plurality of word indices to identify a corresponding word within a respective one of a plurality of word lists;

combining each of the plurality of identified corresponding words to form a word mnemonic; and reducing a size of the hash value prior to mapping the hash value to the plurality of word indices, wherein mapping the hash value into a mnemonic comprises:

dividing the hash value by a product of the number of words in the first word list times the number of words in the second word list times the number of words in the third word list to obtain a reduced hash value;

segmenting the reduced hash value into a plurality of digit portions;

using each of the plurality of digit portions as an index to identify a corresponding word within one of a plurality of word lists; and combining the identified words to form a word mnemonic.

56. A non-transitory processor-readable storage medium having stored thereon processor-executable software instructions configured to cause a processor of a computer to perform steps comprising:

mapping a large number into a plurality of N word indices, referred to as $W_1, W_2 \ldots W_N$, by perform the steps of a. dividing the large number by a product of the number of words in each of the word lists and retaining a division remainder $R_0$,
b. dividing the remainder $R_0$ by the number of words in list $W_1$ to obtain a whole number quotient $Q_1$, and a remainder $R_1$,
c. repeating step b for word indices $W_2$ thru $W_{(N-1)}$ dividing a remainder $R_{i+1}$ by the number of words in list $W_i$ to obtain a whole number quotient $Q_i$, and a remainder $R_i$ and
d. setting $Q_N$ to be a remainder of the last iteration, $R_{(N-1)}$;

using the indices $Q_i$ to index into the plurality of word lists to identify corresponding words; and combining the identified corresponding words into a word mnemonic.

\* \* \* \* \*